(12) United States Patent
Benejam et al.

(10) Patent No.: US 7,084,754 B2
(45) Date of Patent: Aug. 1, 2006

(54) COMMUNICATION STATUS MANAGEMENT SYSTEM AND METHOD

(75) Inventors: Roberto Benejam, Pflugerville, TX (US); Jonathan Samn, Austin, TX (US); Oluyemi Babatunde Saka, Canton, GA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 10/825,190

(22) Filed: Apr. 15, 2004

(65) Prior Publication Data

US 2005/0235035 A1   Oct. 20, 2005

(51) Int. Cl.
*G08B 1/08* (2006.01)
(52) U.S. Cl. .................................. 340/534; 340/691.6
(58) Field of Classification Search ................ 340/534, 340/691.1, 691.6, 7.51, 7.58
See application file for complete search history.

(56) References Cited

U.S. PATENT DOCUMENTS

| | | | |
|---|---|---|---|
| 6,628,194 B1 * | 9/2003 | Hellebust et al. | 340/7.5 |
| 6,871,214 B1 * | 3/2005 | Parsons et al. | 709/206 |
| 6,928,300 B1 * | 8/2005 | Skinner et al. | 455/556.2 |
| 6,970,547 B1 * | 11/2005 | Andrews et al. | 379/210.01 |

* cited by examiner

*Primary Examiner*—Daryl C Pope
(74) *Attorney, Agent, or Firm*—Carr LLP; Diana R. Gerhardt

(57) ABSTRACT

The present invention provides a method for communication status management. A first status change request is received from a user, the first status change request including at least a first user status and a first duration. A first current user communication status is established based on the first status change request. The user is prompted based on the first duration. In a particular aspect, the first status change request includes a first user status message.

23 Claims, 5 Drawing Sheets

COMMUNICATION STATUS MANAGEMENT SYSTEM AND METHOD

TECHNICAL FIELD

The present invention relates generally to the field of communications and, more particularly, to a communication status management system and method.

BACKGROUND

In the business world, time management is essential to complete objectives on schedule. Communication often plays a key role in completing objectives. Modern communication systems often provide messaging services and protocols to allow users to transmit and receive brief messages in real-time or with only a minimal delay. Communication devices and messaging services typically allow users to set and change their current status, generally indicating the user's availability and/or current activity, thereby enabling others to know a user's current communication status. Thus, a user can inform others whether the user is available at a given point in time, which allows for improved communication and time management. A common occurrence, however, is that a user forgets to update their current status to reflect their real-time status. Failure to maintain a current, accurate status can result in the user being interrupted, delayed, or hindered from communications required to complete an objective on schedule. Therefore, there is a need for a method and/or apparatus for managing messaging statuses that addresses at least some of the problems associated with conventional methods and apparatuses.

SUMMARY OF THE INVENTION

The present invention provides a method for communication status management. A first status change request is received from a user, the first status change request including at least a first user status and a first duration. A first current user communication status is established based on the first status change request. The user is prompted based on the first duration.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
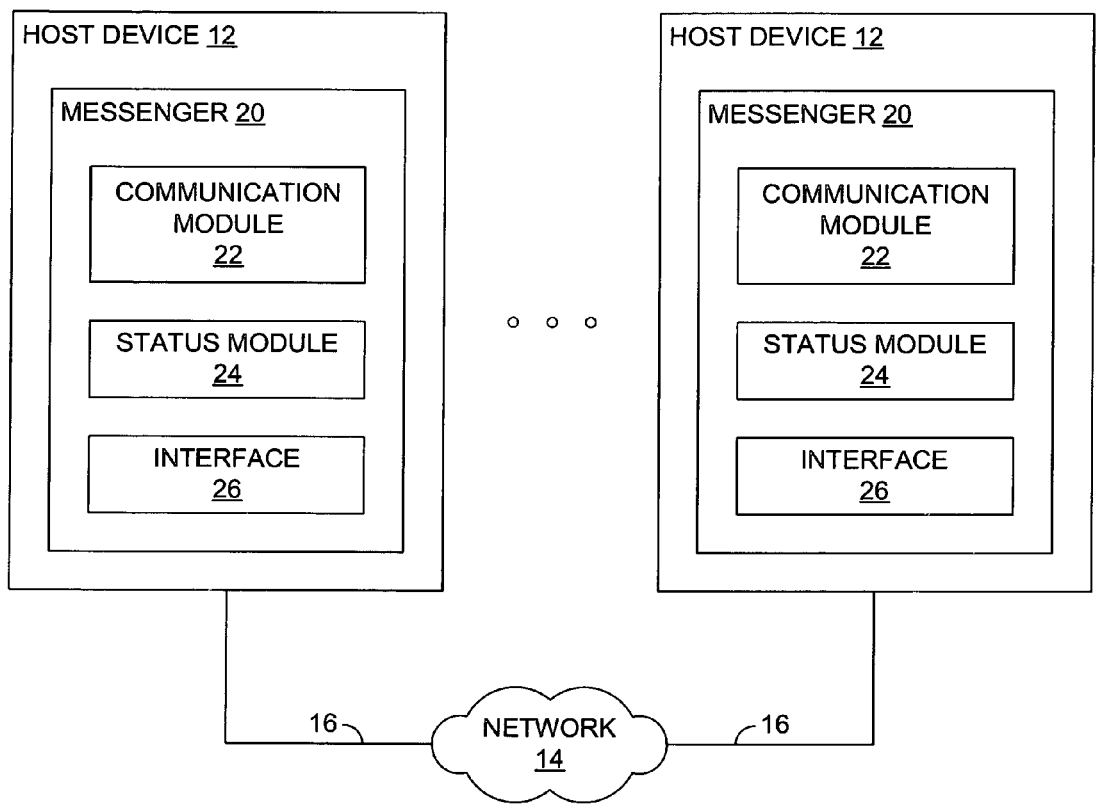
FIG. 1 is a block diagram depicting a communication system.

Referring to FIG. 1 of the drawings, reference numeral 10 generally designates a communications system. Communications system 10 includes a plurality of host devices 12 coupled to a network 14 through a plurality of communication channels 16. Host devices 12 are any devices suitable to be configured to operate a messaging service and protocol including, but not limited to desktop computers, laptop computers, mobile telephones, or other suitable devices. A messaging service and protocol is a system that provides for the exchange of communication status information and text-based messages and files in real-time, contemporaneously, or otherwise without significant delay, and typically constitutes computer program code or software operating in connection with a network, such as, for example, AOL Instant Messenger®, Yahoo! Messenger®, MSN Messenger®, Netscape Messenger®, ICQ Instant Messenger®, and other similar systems. Network 14 is any computer and/or communication network including, but not limited to the Internet, intranets, the Public Switched Telephone Network (PSTN), local area networks (LANs), wide area networks (WANs), or metropolitan area networks (MANs). Communication channels 16 are wireless links, wire line links, satellite links, Internet connections, infrared links, network links or other suitable connection.

Each host device 12 includes a messenger 20. As used herein, "each" means all of a particular subset. Messenger 20 is a messaging service and protocol, as described above. Messenger 20 includes communication module 22, status module 24, and interface 26. Communication module 22 is configured to send and receive communication status information and text-based messages and files and to communicate with status module 24 and interface 26, and generally performs functions typical of a messaging service and protocol. Status module 24 is configured to receive user status preferences, to store user status preferences, to store and transmit a current user status, to prompt a user to update the current user status, and to communicate with communication module 22 and interface 26, as described in more detail below. Interface 26 is configured to display information to a user, to receive input from a user, and to communicate with communication module 22 and status module 24.

In operation, interface 26 displays a variety of information to a subject user, including, for example, a list of one or more other users specified by the subject user, the current user status of other users and the subject user, the current user status message of other users and the subject user, messages sent to or from the subject user, status prompts and reminders, user status preferences, and other information. In the illustrated embodiment, interface 26 interacts with a user through one or more graphical user interfaces (GUIs). It will be understood to one skilled in the art that other suitable methods and systems for interacting with a user can also be employed. In one embodiment, the list of one or more other users and any associated current user statuses and current user status messages are displayed in a single GUI, messages sent to or from the subject user are displayed in a separate GUI for each target user sending messages to or receiving messages from the subject user, and status prompts and reminder and user status preferences are displayed in a separate GUI. It will be understood to one skilled in the art that other suitable configurations can also be employed.

Generally, communication status information includes the current user status and current user status message of a user. Generally, the current user status of a user is information indicating the communication availability of the user and represents, for example, that the user is available, that the user is away from an associated host device 12, that the user does not wish to be disturbed, that the user is, or wishes to appear, offline or otherwise not connected to network 14, or other suitable communication availabilities. The current user status can indicate one or more of a finite, predetermined group of communication availabilities and/or can indicate a custom communication availability based on input from a user. It will be understood to one skilled in the art that other suitable communication availabilities and configurations can also be employed.

Generally, the current user status message of a user is information indicating the task or activity in which the user is engaged or otherwise supplementing the current user status and represents, for example, that the user is in a meeting, that the user is out for lunch, that the user is working on a project, that the user has stepped away from an associated host device 12, that the user is engaged in a telephone call, that the user will return to an associated host device 12 in a certain period of time (or will otherwise "be right back"), other suitable tasks or activities, or other suitable supplemental information. The current user status message can indicate one or more of a finite, predetermined group of tasks, activities, or supplemental information, and/or can indicate a custom task, activity, or supplemental information based on input from a user. It will be understood to one skilled in the art that other suitable configurations and tasks, activities, or supplemental information can also be employed.

In operation, communication module 22 receives text messages and files for transmission to a target user across network 14 from interface 26, receives text messages and files sent from a target user to the subject user from network 14, receives current user statuses of other users from network 14, receives current user status messages of other users from network 14, and receives current user statuses and current user status messages for the subject user from status module 24. In operation, communication module 22 also transmits text messages and files received from network 14 to interface 26, transmits current user statuses and current user status messages received from network 14 to interface 26, transmits current user statuses and current user status messages for the subject user received from status module 24 to interface 26, transmits text messages and files received from interface 26 to network 14, and transmits current user statuses and current user status messages for the subject user received from status module 24 to network 14. It will be understood to one skilled in the art that communication module 22 can also transmit and/or receive other suitable information and/or data, such as, for example, date and time information, clock synchronization information, security information, encryption information, digital signatures, or other suitable information and/or data.

In operation, status module 24 receives and stores user status preferences for the subject user from interface 26, receives and stores current user statuses for the subject user from interface 26, receives and stores current user status messages for the subject user from interface 26, receives and stores status prompt information from interface 26, and receives and stores status prompt response information for the subject user from interface 26. In operation, status module 24 also transmits status prompt information for the subject user to interface 26, transmits user status preferences for the subject user to interface 26, and transmits current user statuses and current user status messages for the subject user to communication module 22. It will be understood to one skilled in the art that status module 24 can also transmit and/or receive other suitable information and/or data, such as, for example, date and time information, clock synchronization information, security information, encryption information, digital signatures, or other suitable information and/or data.

Generally, user status preferences include information relating to a user's preferences for managing the user's status in real-time and at future times and includes, for example, a default current user status, a default current user status message, default status prompt information, scheduled changes to the current user status and current user status message, and/or other suitable information. It will be understood to one skilled in the art that other suitable user status preferences and configurations can also be employed. Generally, status prompt information includes information relating to prompting or reminding a user to update the user's current communication status and includes, for example, a current user status, a current user status message, suggested changes to the current user status and current user status message based on scheduled changes and/or default preferences, and/or other suitable information. It will be understood to one skilled in the art that other suitable status prompt information and configurations can also be employed.

Generally, status prompt response information includes information received from a user in response to a prompt or reminder to update the user's communication status and includes, for example, an updated current user status, an updated current user status message, a request to remind the user again after a specified period of time has passed, scheduled changes to the user's communication status, a request to maintain the user's communication status and disable further prompts or reminders, and/or other suitable information. It will be understood to one skilled in the art that other suitable status prompt response information and configurations can also be employed.

In the illustrated embodiment, communication module 22, status module 24, and interface 26 are depicted as separate, discrete components of messenger 20. In alternative embodiments, communication module 22, status module 24, and interface 26 can be combined into a single device or module, one or more separate devices or modules, or otherwise suitably combined.

Figure 2:
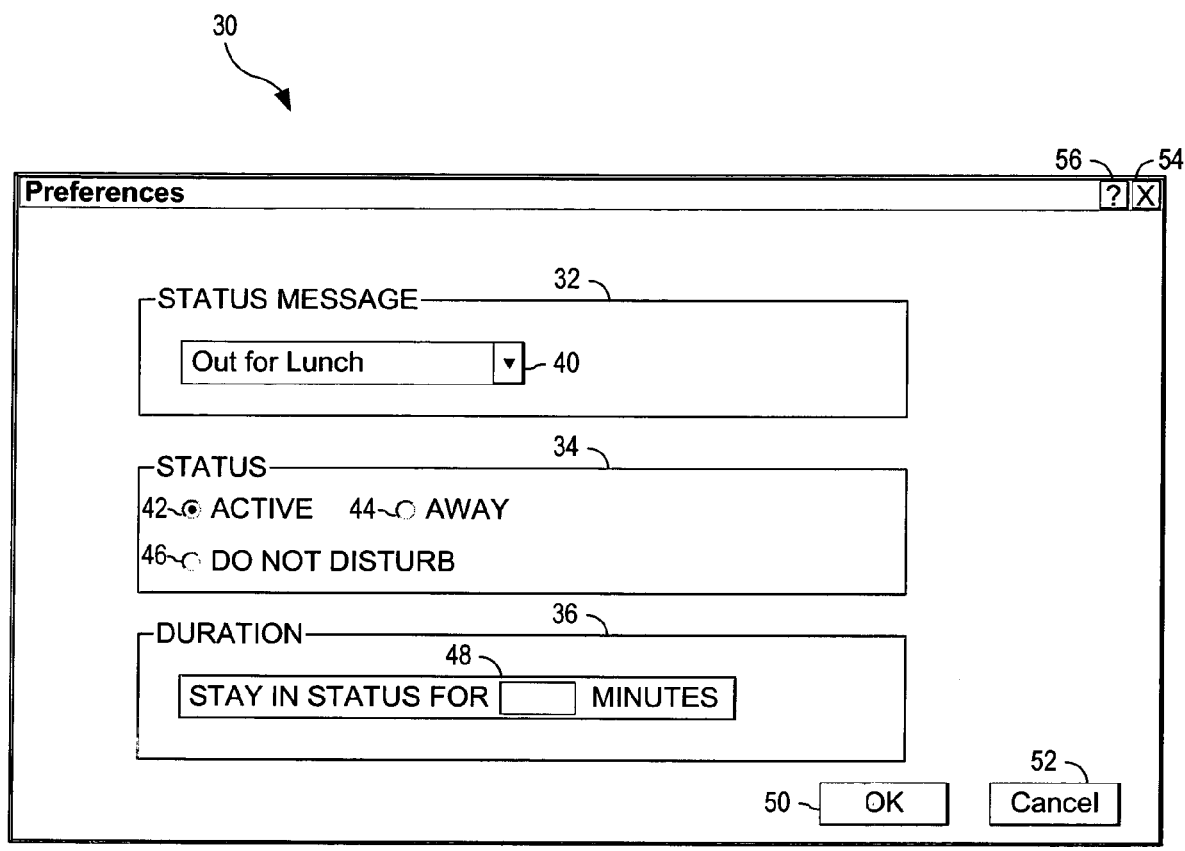
FIG. 2 is a block diagram depicting a graphical user interface (GUI) for messaging status management.

Referring to FIG. 2 of the drawings, the reference numeral 30 generally designates an example preferences graphical user interface (GUI) for managing a user's communication status. Generally, preferences GUI 30 is configured to display a user's communication status information and user status preferences to a user and to receive input from a user. In particular, preferences GUI 30 is configured to allow a user to designate a current user status, current user status message, and a duration to maintain the designated current user status and current user status message, as described in more detail below. Generally, in operation, preferences GUI 30 is displayed to a user through interface 26 of FIG. 1, and the user's communication status information, user status preferences, and user input is transmitted to and/or received from status module 24 of FIG. 1.

Preferences GUI 30 includes status message block 32, status block 34, and duration block 36. Status message block 32 includes message button 40. As used herein, a button is any GUI feature configured to receive user input and includes, for example, drop-down boxes, radio buttons, check boxes, virtual push buttons, static text input boxes, and other suitable GUI features. A button can also include an associated label to indicate generally an effect or function associated with the button. In the illustrated embodiment, message button 40 is a drop down box configured to receive a text-based custom user status message from a user and to display a variety of standard user status messages for selection by a user. It will be understood to one skilled in the art that other suitable buttons and configurations can also be employed, such as, for example, a plurality of radio buttons representing standard user status messages, or other suitable buttons and configurations. Moreover, all of the buttons in the illustrated embodiments herein are example buttons only and can be exchanged with, combined with, or substituted for other suitable buttons and configurations, unless indicated otherwise. In operation, the user designates a current user status message by selecting one of the standard user status messages or inputting a custom user status message.

Status block 34 includes active button 42, away button 44, and do not disturb button 46. In the illustrated embodiment, active button 42, away button 44, and do not disturb button 46 are radio buttons representing predetermined user statuses and are configured to receive user input in the form of a mouse click and to allow a user to indicate the user's current user status. As illustrated, active button 42 represents an active communication status, away button 44 represents an away communication status, and do not disturb button 46 represents a do not disturb communication status. In operation, the user designates a current user status by selecting one of active button 42, away button 44, and do not disturb button 46.

Duration block 36 includes duration input block 48. In the illustrated embodiment, duration input block 48 is a text input box and is configured to receive user input in the form of a number and thereby allow a user to indicate the length of time the user desires to maintain the communication status designated through status message block 32 and status block 34. In operation, the user designates the length of time to maintain the communication status by entering a number. Thus, a user can set the user's communication status for a designated period of time, such as, for example, when the user is about to leave the office for lunch and will return in one hour. In the illustrated embodiment, the user enters a number representing the number of minutes to maintain the communication status. It will be understood to one skilled in the art that other suitable units of time can also be employed.

Preferences GUI 30 also includes buttons typically found in modern GUIs, such as OK button 50, cancel button 52, cancel button 54, and help button 56. OK button 50 is a virtual push button and is configured to receive user input in the form of a mouse click and thereby allow the user to indicate that the user has completed the desired communication status and duration designations. In operation, when the user clicks OK button 50, interface 26 of FIG. 1 closes preferences GUI 30 and transmits received user input to status module 24 of FIG. 1. Cancel button 52 and cancel button 54 are virtual push buttons and are configured to receive user input in the form of a mouse click and thereby allow the user to indicate that the user does not desire to modify the user's current communication status. In operation, when the user clicks cancel button 52 or cancel button 54, interface 26 of FIG. 1 closes preferences GUI 30. Help button 56 is a virtual push button and is configured to receive user input in the form of a mouse click and thereby allow the user to indicate that the user desires to view a help GUI. In operation, when the user clicks help button 56, interface 26 of FIG. 1 displays an associated help GUI (not shown).

Figure 3:
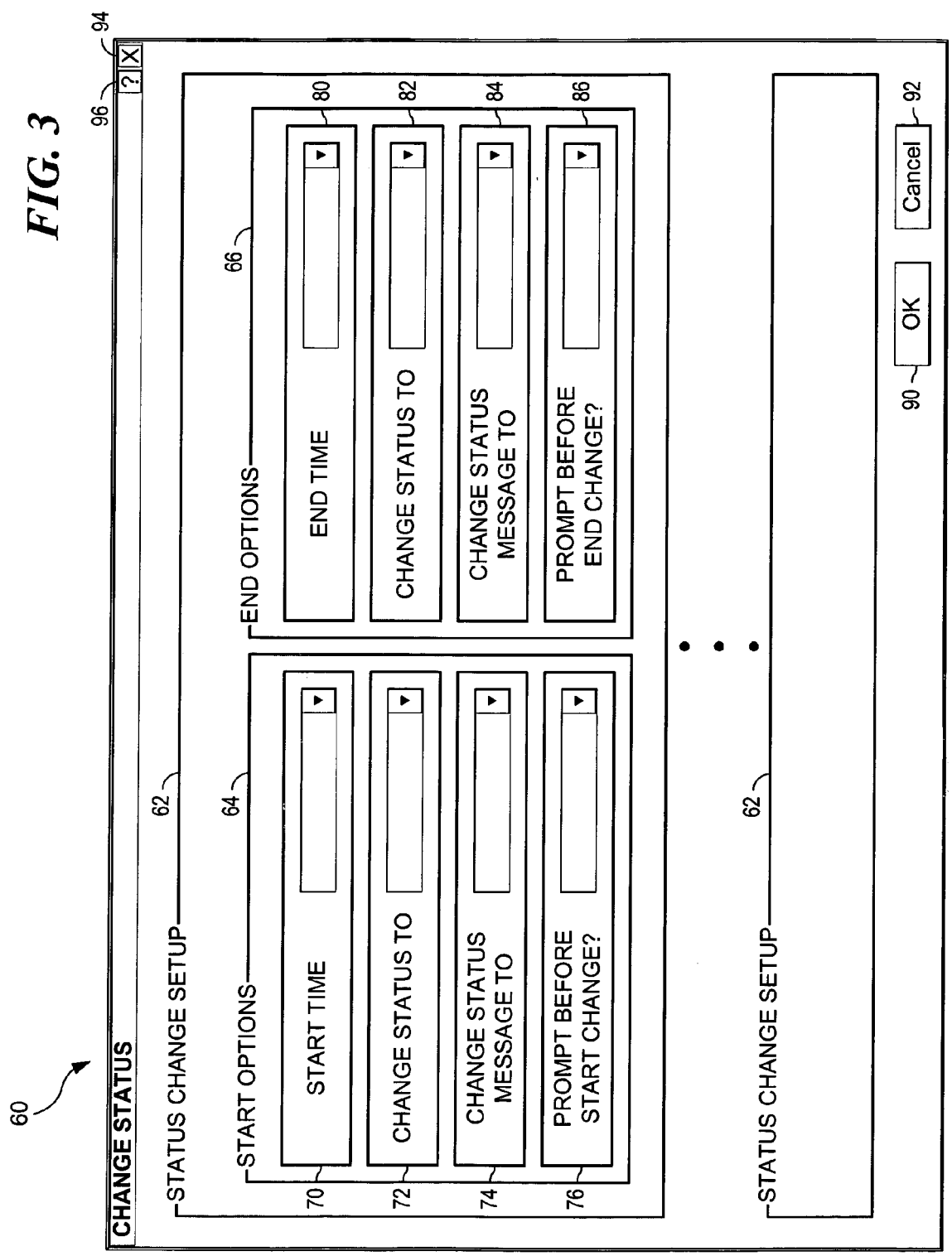
FIG. 3 is a block diagram depicting a GUI for messaging status management.

Referring to FIG. 3 of the drawings, the reference numeral 60 generally designates an example change status graphical user interface (GUI) for managing a user's communication status. Generally, change status GUI 60 is configured to display a user's communication status information and user status preferences to a user and to receive input from a user. In particular, change status GUI 60 is configured to allow a user to designate a current user status, a current user status message, a time at which the designated current user status and designated current user status message are to take effect, a time at which the designated current user status and designated current user status message are to expire, a reminder preference to alert the user before or when the designated current user status and designated current user status message take effect, an updated current user status and updated current user status message to take effect upon expiration of the designated current user status and designated current user status message, and a reminder preference to alert the user before or when the updated current user status and updated current user status message take effect, as described in more detail below. Generally, in operation, change status GUI 60 is displayed to a user through interface 26 of FIG. 1, and the user's communication status information, user status preferences, and user input is transmitted to and/or received from status module 24 of FIG. 1.

Change status GUI 60 includes one or more status change setup blocks 62. Generally, status change setup blocks 62 are configured to receive user input to allow the user to designate one or more scheduled changes to the user's communication status and user status preferences. In particular, each status change setup block 62 includes start options block 64 and end options block 66. Start options block 64 includes start time button 70, status button 72, status message button 74, and prompt button 76. Start time button 70 is a drop down box configured to display a variety of standard start times for selection by a user. In the illustrated embodiment, standard start times include a range of periodic clock times, such as, for example, clock times for every hour in the day, fifteen minutes past every hour in the day, thirty minutes past every hour in the day, and fifteen minutes before every hour in the day. In an alternative embodiment, standard start times include a range of elapsed minutes after the user completes the user's input, such as, for example, five, ten, fifteen, or twenty minutes after the user completes the user's inputs. It will be understood to one skilled in the art that other times, periodicities, and configurations can also be employed. In operation, the user designates a start time by selecting one of the standard start times.

Status button 72 is a drop down box configured to display a variety of standard user statuses for selection by a user. In the illustrated embodiment, standard user statuses include "available," "away," "invisible," and "do not disturb." It will be understood to one skilled in the art that other standard user statuses can also be employed. In operation, the user designates a current user status to take effect at the designated start time by selecting one of the standard user statuses.

Status message button 74 is a drop down box configured to receive a text-based custom user status message from a user and to display a variety of standard user status messages for selection by a user. In the illustrated embodiment, standard user status messages include "Out for Lunch," "In a Meeting," "On the Telephone," "Busy," "Working," "Away from Desk," "Stepped Out," and "Be Right Back." It will be understood to one skilled in the art that other standard user status messages can also be employed. In operation, the user designates a current user status message to take effect at the designated start time by selecting one of the standard user status messages or inputting a custom user status message.

Prompt button 76 is a drop down box configured to display a variety of reminder options for selection by a user. In the illustrated embodiment, reminder options include a range of periodic clock times, a range of minutes in advance of the designated start time, and an option to not prompt the user before the designated user status and designated user status message take effect. It will be understood to one skilled in the art that other times, periodicities, options, and configurations can also be employed. In operation, the user designates a start time reminder preference by selecting one of the reminder options.

End options block 66 includes end time button 80, status button 82, status message button 84, and prompt button 86. End time button 80 is a drop down box configured to display a variety of standard end times for selection by a user, to allow the user to designate when the designated user status and designated user status message are to expire. In the illustrated embodiment, standard end times include a null option, to designate that the designated user status and designated user status message do not expire, and a range of periodic clock times, such as, for example, clock times for every hour in the day, fifteen minutes past every hour in the day, thirty minutes past every hour in the day, and fifteen minutes before every hour in the day. In an alternative embodiment, standard end times include a range of elapsed minutes after the designated start time, such as, for example, five, ten, fifteen, or twenty minutes after the designated start time. It will be understood to one skilled in the art that other times, periodicities, and configurations can also be employed. In operation, the user designates an end time when the designated user status and designated user status message are to expire by selecting one of the standard end times.

Status button 82 is a drop down box configured to display a variety of standard user statuses for selection by a user, to allow the user to designate an updated user status to take effect at the designated end time. In the illustrated embodiment, standard user statuses include "available," "away," "invisible," and "do not disturb." It will be understood to one skilled in the art that other standard user statuses can also be employed. In operation, the user designates an updated user status to take effect at the designated end time by selecting one of the standard user statuses.

Status message button 84 is a drop down box configured to receive a text-based custom user status message from a user and to display a variety of standard user status messages for selection by a user, to allow the user to designate an updated user status message to take effect at the designated end time. In the illustrated embodiment, standard user status messages include "Out for Lunch," "In a Meeting," "On the Telephone," "Busy," "Working," "Away from Desk," "Stepped Out," and "Be Right Back." It will be understood to one skilled in the art that other standard user status messages can also be employed. In operation, the user designates an updated user status message to take effect at the designated end time by selecting one of the standard user status messages or inputting a custom user status message.

Prompt button 86 is a drop down box configured to display a variety of reminder options for selection by a user. In the illustrated embodiment, reminder options include a range of periodic clock times, a range of minutes in advance of the designated end time, and an option to not prompt the user before the updated user status and updated user status message take effect. It will be understood to one skilled in the art that other times, periodicities, options, and configurations can also be employed. In operation, the user designates an end time reminder preference by selecting one of the reminder options. Thus, by providing input to one or more status change setup blocks 62, a user can schedule changes to the user's current user status and current user status message and can schedule reminder prompts to alert the user before or when the user's current user status and current user status message change.

Change status GUI 60 also includes buttons typically found in modern GUIs, such as OK button 90, cancel button 92, cancel button 94, and help button 96. OK button 90 is a virtual push button and is configured to receive user input in the form of a mouse click and thereby allow the user to indicate that the user has completed the desired communication status and duration designations. In operation, when the user clicks OK button 90, interface 26 of FIG. 1 closes change status GUI 60 and transmits received user input to status module 24 of FIG. 1. Cancel button 92 and cancel button 94 are virtual push buttons and are configured to receive user input in the form of a mouse click and thereby allow the user to indicate that the user does not desire to modify the user's current communication status. In operation, when the user clicks cancel button 92 or cancel button 94, interface 26 of FIG. 1 closes change status GUI 60. Help button 96 is a virtual push button and is configured to receive user input in the form of a mouse click and thereby allow the user to indicate that the user desires to view a help GUI. In operation, when the user clicks help button 96, interface 26 of FIG. 1 displays an associated help GUI (not shown).

Figure 4:
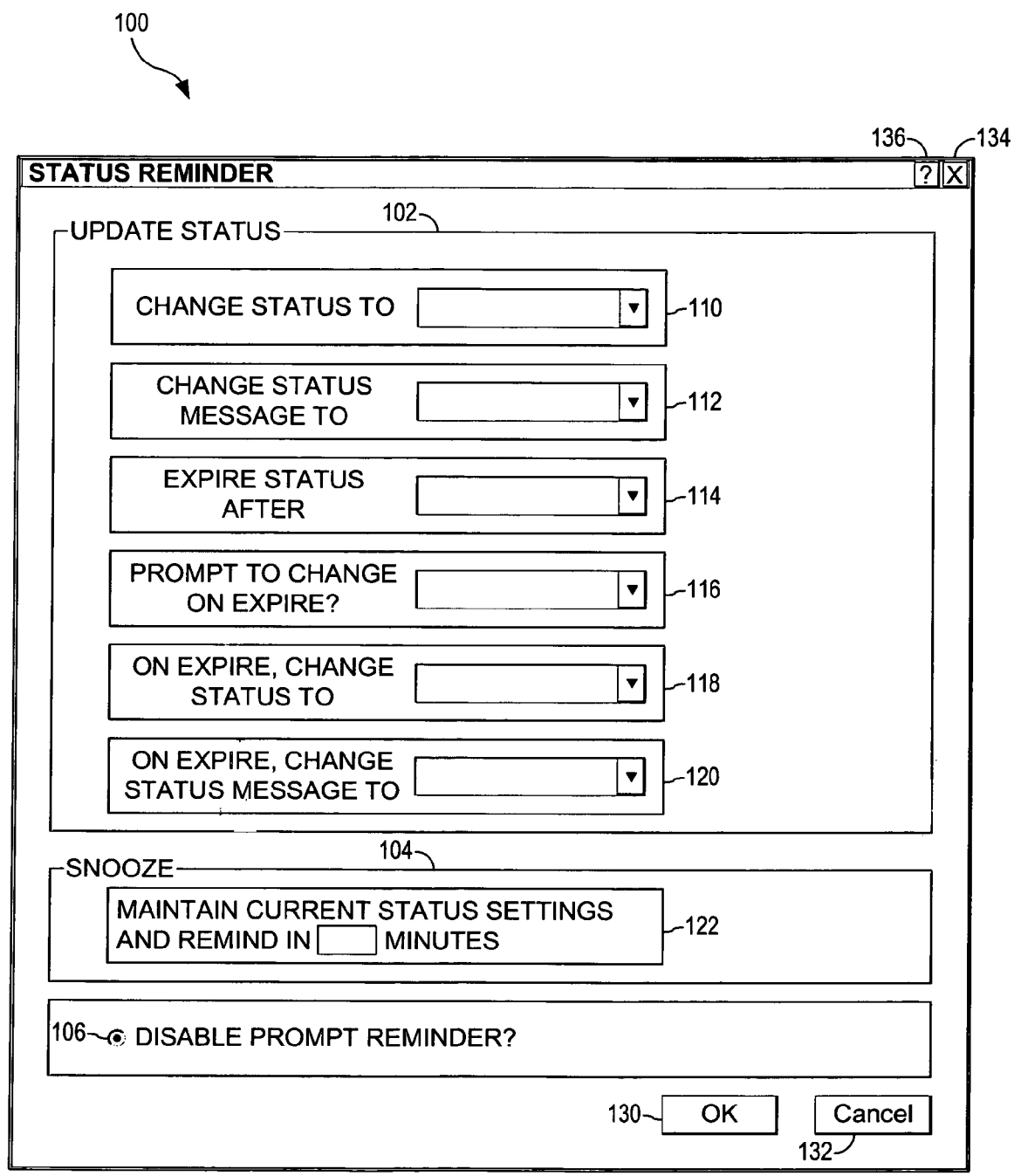
FIG. 4 is a block diagram depicting a GUI for messaging status management.

Referring to FIG. 4 of the drawings, the reference numeral 100 generally designates an example status reminder graphical user interface (GUI) for managing a user's communication status. Generally, status reminder GUI 100 is configured to display a user's communication status information and user status preferences to a user and to receive input from a user. In particular, status reminder GUI 100 is configured to allow a user to designate a current user status, a current user status message, a time at which the designated current user status and designated current user status message are to expire, a reminder preference to alert the user before or when the designated current user status and designated current user status message are to expire, and an updated current user status and updated current user status message to take effect upon expiration of the designated current user status and designated current user status message, as described in more detail below. Status reminder GUI 100 is also configured to allow a user to maintain the current user status and current user status message and remind the user after a designated elapsed time, and to disable status reminder notices, as described in more detail below. Generally, in operation, status reminder GUI 100 is displayed to a user through interface 26 of FIG. 1, and the user's communication status information, user status preferences, and user input is transmitted to and/or received from status module 24 of FIG. 1. In one embodiment, status reminder GUI 100 is displayed to a user based on user reminder preferences received by change status GUI 60 of FIG. 3 or preferences GUI 30 of FIG. 2.

Status reminder GUI 100 includes update status block 102, snooze block 104, and disable block 106. Generally, update status block 102 is configured to receive user input to allow the user to designate changes to the user's communication status and user status preferences. In particular, update status block 102 includes change status button 110, change status message button 112, expire status button 114, prompt button 116, update status button 118, and update status message button 120. Change status button 110 is a drop down box configured to display a variety of standard user statuses for selection by a user. In the illustrated embodiment, standard user statuses include "available," "away," "invisible," and "do not disturb." It will be understood to one skilled in the art that other standard user statuses can also be employed. In operation, the user designates a current user status by selecting one of the standard user statuses.

Change status message button 112 is a drop down box configured to receive a text-based custom user status message from a user and to display a variety of standard user status messages for selection by a user. In the illustrated embodiment, standard user status messages include "Out for Lunch," "In a Meeting," "On the Telephone," "Busy," "Working," "Away from Desk," "Stepped Out," and "Be Right Back." It will be understood to one skilled in the art that other standard user status messages can also be employed. In operation, the user designates a current user status message by selecting one of the standard user status messages or inputting a custom user status message.

Expire status button 114 is a drop down box configured to display a variety of standard end times for selection by a user, to allow the user to designate when the designated current user status and designated current user status message are to expire. In the illustrated embodiment, standard end times include a null option, to designate that the designated user status and designated user status message do not expire, and a range of periodic clock times, such as, for example, clock times for every hour in the day, fifteen minutes past every hour in the day, thirty minutes past every hour in the day, and fifteen minutes before every hour in the day. In an alternative embodiment, standard end times include a range of elapsed minutes, such as, for example, five, ten, fifteen, or twenty minutes. It will be understood to one skilled in the art that other times, periodicities, and configurations can also be employed. In operation, the user designates an end time when the designated current user status and designated current user status message are to expire by selecting one of the standard end times.

Prompt button 116 is a drop down box configured to display a variety of reminder options for selection by a user. In the illustrated embodiment, reminder options include a range of periodic clock times, a range of minutes in advance of the designated end time, and an option to not prompt the user before the designated current user status and designated current user status message are to expire. It will be understood to one skilled in the art that other times, periodicities, options, and configurations can also be employed. In operation, the user designates an end time reminder preference by selecting one of the reminder options.

Update status button 118 is a drop down box configured to display a variety of standard user statuses for selection by a user, to allow the user to designate an updated current user status to take effect at the designated end time. In the illustrated embodiment, standard user statuses include "available," "away," "invisible," and "do not disturb." It will be understood to one skilled in the art that other standard user statuses can also be employed. In operation, the user designates an updated current user status to take effect at the designated end time by selecting one of the standard user statuses.

Update status message button 120 is a drop down box configured to receive a text-based custom user status message from a user and to display a variety of standard user status messages for selection by a user, to allow the user to designate an updated current user status message to take effect at the designated end time. In the illustrated embodiment, standard user status messages include "Out for Lunch," "In a Meeting," "On the Telephone," "Busy," "Working," "Away from Desk," "Stepped Out," and "Be Right Back." It will be understood to one skilled in the art that other standard user status messages can also be employed. In operation, the user designates an updated current user status message to take effect at the designated end time by selecting one of the standard user status messages or inputting a custom user status message. Thus, by providing input to update status block 102, a user can schedule changes to the user's current user status and current user status message and can schedule reminder prompts to alert the user before or when the user's current user status and current user status message change.

Status reminder GUI 100 also includes snooze block 104. In the illustrated embodiment, snooze block 104 is a text input box and is configured to receive user input in the form of a number and thereby allow a user to designate a snooze time indicating the length of time the user desires to maintain the user's current communication status and to remind the user to change the user's communication status after the indicated length of time has passed. In operation, the user designates the snooze time by entering a number. Thus, a user can postpone updating the user's communication status for a designated period of time, such as, for example, when the user expects the user's communication status to remain accurate for the designated period of time, or when the user is too busy to update the user's communication status. In the illustrated embodiment, the user enters a number representing the snooze time in minutes. It will be understood to one skilled in the art that other suitable units of time can also be employed.

Status reminder GUI 100 also includes disable block 106. In the illustrated embodiment, disable block 106 is a check box and is configured to receive user input in the form of a mouse click to allow a user to maintain the user's current user status and current user status message indefinitely and to disable further reminders or prompts regarding the user's current communication status. Thus, a user can maintain the user's current communication status without further interruption. In the illustrated embodiment, the user maintains the current communication status and disables further reminders by clicking disable block 106.

Status reminder GUI 100 also includes buttons typically found in modern GUIs, such as OK button 130, cancel button 132, cancel button 134, and help button 136. OK button 130 is a virtual push button and is configured to receive user input in the form of a mouse click and thereby allow the user to indicate that the user has completed the desired communication status and duration designations. In operation, when the user clicks OK button 130, interface 26 of FIG. 1 closes status reminder GUI 100 and transmits received user input to status module 24 of FIG. 1. Cancel button 132 and cancel button 134 are virtual push buttons and are configured to receive user input in the form of a mouse click and thereby allow the user to indicate that the user does not desire to modify the user's current communication status. In operation, when the user clicks cancel button 132 or cancel button 134, interface 26 of FIG. 1 closes status reminder GUI 100. Help button 136 is a virtual push button and is configured to receive user input in the form of a mouse click and thereby allow the user to indicate that the user desires to view a help GUI. In operation, when the user clicks help button 136, interface 26 of FIG. 1 displays an associated help GUI (not shown).

Figure 5:
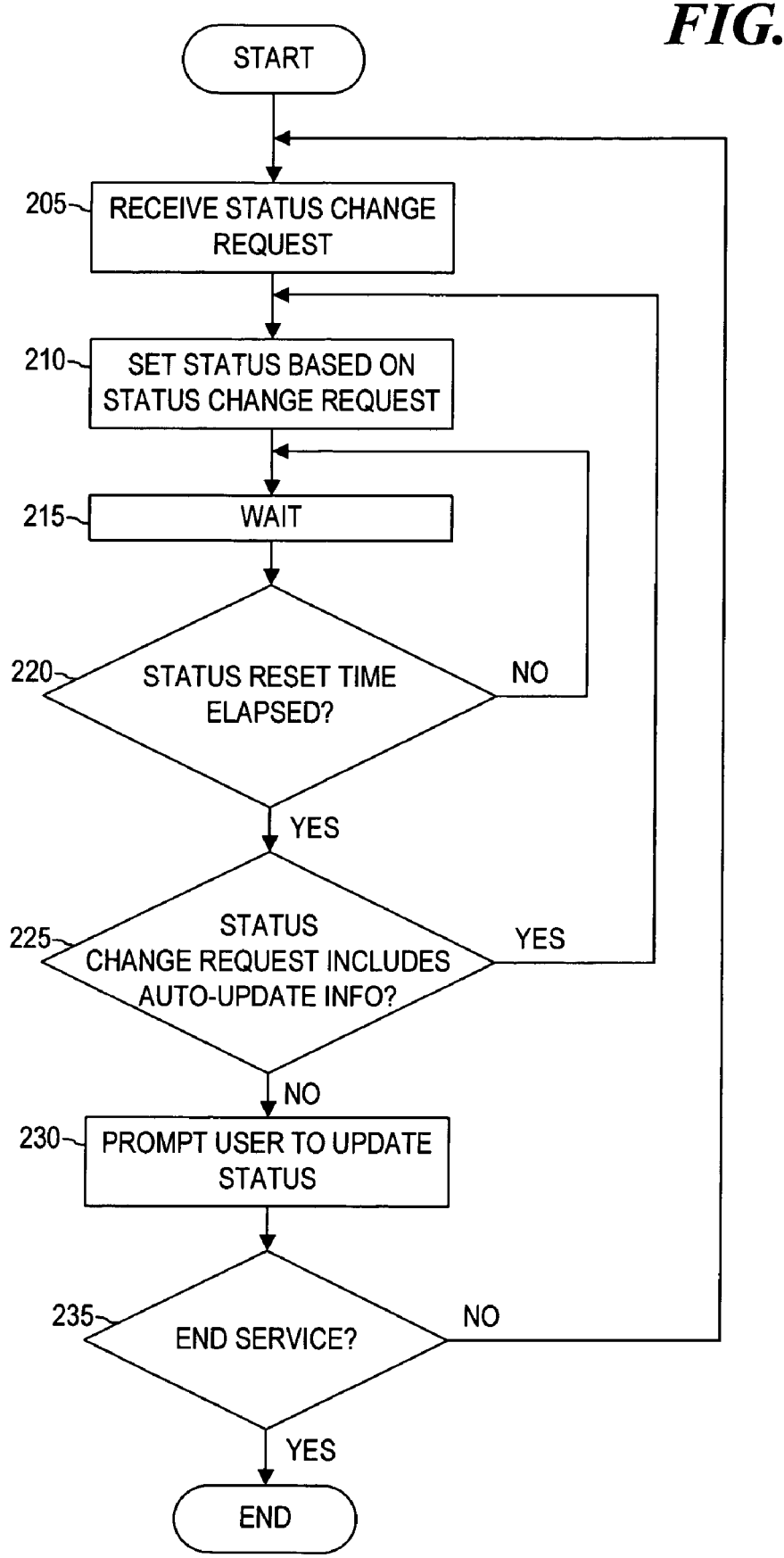
FIG. 5 is a flow diagram depicting a messaging status management method.

Referring to FIG. 5 of the drawings, the reference numeral 200 generally designates a flow chart depicting a method for communication status management. Generally, the steps of the method described in FIG. 5 are performed by messenger 20 of FIG. 1. For ease of understanding, the description below will refer to the component or components of messenger 20 of FIG. 1 that generally perform that particular step. It will be understood to one skilled in the art that other components of messenger 20 can also perform one or more of the steps of the method described in FIG. 5, as appropriate.

In step 205, a status change request is received. As described above, in one embodiment, a status change request includes a user communication status and a duration or status reset time during which the user communication status is maintained. In one embodiment, step 205 is performed by interface 26 of FIG. 1 employing preferences GUI 30 of FIG. 2. It will be understood to one skilled in the art that preferences GUI 30 of FIG. 2, change status GUI 60 of FIG. 3, and status reminder GUI 100 of FIG. 4 are example GUIs that can be employed as appropriate to perform the steps performed by interface 26 of FIG. 1. Moreover, it will be understood to one skilled in the art that other suitable GUIs or interface systems and methods can also be employed by interface 26, as described above, without departing from the spirit or scope of the present invention. Therefore, to simplify description of the steps of the method depicted in FIG. 5, steps that are described as performed by interface 26 will be understood to be performed by interface 26 employing preferences GUI 30 of FIG. 2, change status GUI 60 of FIG. 3, status reminder GUI 100 of FIG. 4, and/or other suitable interface systems or methods, as appropriate.

In step 210, a user communication status is set based on the status change request received in step 205. As described above, the user communication status can include a current user status and current user status message. This step is performed by status module 24 of FIG. 1. Status module 24 transmits the user communication status to communication module 22 of FIG. 1, as described above. In step 215, a period of time elapses. Generally, in step 215, communication module 20 waits for the duration or status reset time designated in step 205 to elapse. It will be understood to one skilled in the art that other operations can continue contemporaneously with step 215, such as, for example, messaging communications, file transfers, and other operations. Moreover, it will be understood to one skilled in the art that a user can supercede the duration or status reset time designated in step 205, by, for example, sending a status change request at a time before the designated duration or status reset time has elapsed. In decisional step 220, a determination is made whether the duration or status reset time designated in step 205 has elapsed. This step is performed by status module 24 of FIG. 1. If at decisional step 220 the duration or status reset time designated in step 205 has not elapsed, the process continues along the NO branch, returning to step 215.

If at decisional step 220 the duration or status reset time designated in step 205 has elapsed, the process continues along the YES branch to step 225. In step 225 a determination is made whether the status change request received in step 205 includes a user communication status to take effect after the duration or status reset time designated in step 205 has elapsed. This step is performed by status module 24 of FIG. 1. If at decisional step 225 the status change request received in step 205 includes a user communication status to take effect after the duration or status reset time designated in step 205 has elapsed, the process continues along the YES branch to step 210, wherein the user status is set based on the user communication status to take effect after the duration or status reset time designated in step 205.

If at decisional step 225 the status change request received in step 205 does not include a user communication status to take effect after the duration or status reset time designated in step 205 has elapsed, the process continues along the NO branch to step 230. In step 230, a user is prompted to update the user's communication status and user input is received from the user. This step is performed by interface 26 of FIG. 1. As described above, in one embodiment, user input received in response to a prompt or reminder to update the user's communication status includes an updated communication status, a designated period of time during which the current user communication status is to be maintained and after which the user is prompted or reminded to update the user's communication status, an input that indicates that the current user communication status is to be maintained indefinitely without additional prompts or reminders, or other suitable information.

In decisional step 235 a determination is made whether the user input received in step 230 includes an input that indicates that the current user communication status is to be maintained indefinitely without additional prompts or reminders. That is, a determination is made whether the user has indicated that the user desires to end or disable the status reminder service and to maintain the current user communication status. This step is performed by status module 24 of FIG. 1. If in decisional step 235 the user input received in step 230 includes an input that indicates that the current user communication status is to be maintained indefinitely without additional prompts or reminders, the process continues along the YES branch and the process ends. If in decisional step 235 the user input received in step 230 does not includes an input that indicates that the current user communication status is to be maintained indefinitely without additional prompts or reminders, the process continues along the NO branch to step 205 wherein a status change request is received. In the illustrated embodiment, the status change request received in step 205 after step 235 includes user input received in step 230 in response to a prompt or reminder. In an alternative embodiment, the status change request received in step 205 after step 235 is independent from user input received in step 230.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for communication status management, comprising:
   receiving a first status change request from a user, the first status change request including at least a first user status indicative of a communication availability of the user and a first duration specifying a period of time during which the first user status is to be maintained;
   establishing a user communication status based on the first status change request;
   waiting for the period of time specified by the first duration to elapse;
   determining if the first status change request includes a second user status to take effect after the period of time specified by the first duration has elapsed, wherein the second user status is indicative of a communication availability of the user; and
   in the event the first status change request does not include the second user status, prompting the user to update the user communication status.

2. The method as recited in claim 1, wherein the first status change request further includes a first user status message including information regarding the first user status.

3. The method as recited in claim 2, wherein the first status change request further includes the second user status and a second user status message including information regarding the second user status.

4. The method as recited in claim 1, further comprising:
   in the event the first status change request includes the second user status, updating the user communication status based on the second user status.

5. The method as recited in claim 1, further comprising:
   receiving user input following the prompting, wherein the user input includes an updated communication status indicative of a communication availability of the user and an updated duration specifying a period of time during which the updated communication status is to be maintained.

6. The method as recited in claim 5, further comprising:
   determining if the user input includes an indication that the updated communication status is to be maintained indefinitely without additional prompting.

7. The method as recited in claim 6, further comprising:
   in the event the user input does not include an indication that the updated communication status is to be maintained indefinitely without additional prompting, updating the user communication status based on the user input.

8. The method as recited in claim 1, further comprising transmitting the user communication status.

9. A communication system, comprising:
   an interface configured to receive a first status change request from a user, the first status change request including at least a first user status indicative of a communication availability of the user and a first duration specifying a period of time during which the first user status is to be maintained;
   a status module operatively coupled to the interface and configured to establish a user communication status based on the first status change request, and to determine if the first status change request includes a second user status to take effect after the period of time specified by the first duration has elapsed, wherein the second user status is indicative of a communication availability of the user; and
   wherein the interface is further configured to prompt the user to update the user communication status in the event the first status change request does not include the second user status.

10. The communication system as recited in claim 9, wherein the first status change request further includes a first user status message including information regarding the first user status.

11. The communication system as recited in claim 10, wherein the first status change request further includes a second user status indicative of a communication availability of the user and a second user status message including information regarding the second user status.

12. The communication system as recited in claim 9, wherein the status module is further configured to update the user communication status based on the second user status in the event the first status change request includes the second user status.

13. The communication system as recited in claim 9, wherein the interface is configured to receive user input following the prompting, and wherein the user input includes an updated communication status indicative of a communication availability of the user and an updated duration specifying a period of time during which the updated communication status is to be maintained.

14. The communication system as recited in claim 13, wherein the status module is configured to update the user communication status based on the user input in the event the user input does not include an indication that the updated communication status is to be maintained indefinitely without additional prompting.

15. The communication system as recited in claim 9, further comprising a communication module operatively coupled to the interface and to the status module, and configured to transmit the user communication status.

16. A computer program product for communication status management, the computer program product having a medium with a computer program embodied thereon, the computer program comprising:
   computer program code for receiving a first status change request from a user, the first status change request including at least a first user status indicative of a communication availability of the user and a first duration specifying a period of time during which the first user status is to be maintained;
   computer program code for establishing a user communication status based on the first status change request;
   computer program code for waiting for the period of time specified by the first duration to elapse;
   computer program code for determining if the first status change request includes a second user status to take effect after the period of time specified by the first duration has elapsed, wherein the second user status is indicative of a communication availability of the user; and
   computer program code for, in the event the first status change request does not include the second user status, prompting the user to update the user communication status.

17. The computer program product as recited in claim 16, wherein the first status change request further includes a first user status message including information regarding the first user status.

18. The computer program product as recited in claim 17, wherein the first status change request further includes a second user status indicative of a communication availability of the user and a second user status message including information regarding the second user status.

19. The computer program product as recited in claim 18, further comprising computer program code for, in the event the first status change request includes the second user status, updating the user communication status based on the second user status.

20. The computer program product as recited in claim 16, further comprising:
   computer program code for receiving user input following the prompting, wherein the user input includes an updated communication status indicative of a communication availability of the user, and an updated duration specifying a period of time during which the updated communication status is to be maintained.

21. The computer program product as recited in claim 20, further comprising:
   computer program code for determining if the user input includes an indication that the updated communication status is to be maintained indefinitely without additional prompting.

22. The computer program product as recited in claim 21, further comprising:
   computer program code for, in the event the user input does not include an indication that the updated communication status is to be maintained indefinitely without additional prompting, updating the user communication status based on the user input.

23. The computer program product as recited in claim 16, further comprising computer program code for transmitting the user communication status.

* * * * *